United States Patent
Kim et al.

(10) Patent No.: US 12,311,738 B2
(45) Date of Patent: May 27, 2025

(54) COMPRESSOR CONTROL METHOD

(71) Applicant: Hanon Systems, Daejeon (KR)

(72) Inventors: Hong Min Kim, Daejeon (KR); Kweon Soo Lim, Daejeon (KR); Soo Cheol Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 124 days.

(21) Appl. No.: 18/042,788

(22) PCT Filed: Aug. 25, 2021

(86) PCT No.: PCT/KR2021/011369
§ 371 (c)(1),
(2) Date: Feb. 24, 2023

(87) PCT Pub. No.: WO2022/045765
PCT Pub. Date: Mar. 3, 2022

(65) Prior Publication Data
US 2023/0356567 A1    Nov. 9, 2023

(30) Foreign Application Priority Data

Aug. 26, 2020  (KR) .................. 10-2020-0107907
Aug. 24, 2021  (KR) .................. 10-2021-0111904

(51) Int. Cl.
*B60H 1/32*    (2006.01)
(52) U.S. Cl.
CPC .................. *B60H 1/3214* (2013.01)
(58) Field of Classification Search
CPC .......... B60H 1/3208; B60H 2001/3266; B60H 2001/3272; F25B 2700/151; F25B 2500/19
See application file for complete search history.

(56) References Cited

U.S. PATENT DOCUMENTS 5,014,522 A * 5/1991 Noji .................. B60H 1/00785
                                                                62/227
5,172,563 A * 12/1992 Fujii .................. G05D 23/1931
                                                                62/158

(Continued)

FOREIGN PATENT DOCUMENTS

JP    2005178675 A    7/2005
JP    2006205931 A    8/2006

(Continued)

*Primary Examiner* — Nelson J Nieves
*Assistant Examiner* — Meraj A Shaikh
(74) *Attorney, Agent, or Firm* — Shumaker, Loop & Kendrick, LLP; James D. Miller (57) ABSTRACT

A compressor control method, including: when driving of a compressor of a vehicular air conditioner starts, a determining step of determining whether a condition for limiting an output of the compressor is satisfied by using at least one among whether a power supply unit of a vehicle is reset, a start-off period and the number of times the compressor is driven; an output limiting step of limiting an output of the compressor when the condition for limiting the output of the compressor is satisfied; a third determining step of determining an output limiting driving time of the compressor driven in a state in which the output is limited by the output limiting step; a normal driving step of canceling the output limitation of the compressor and normally driving the compressor when the output limiting driving time of the compressor is equal to or greater than a predetermined reference time.

18 Claims, 4 Drawing Sheets

(56) References Cited

U.S. PATENT DOCUMENTS

| | | | |
|---|---|---|---|
| 5,617,730 A | | 4/1997 | Suzuki |
| 5,802,861 A | * | 9/1998 | Yamashita ............ B60H 1/3208 62/133 |
| 6,892,549 B2 | * | 5/2005 | Komura ............... B60H 1/3208 62/236 |
| 2016/0069347 A1 | * | 3/2016 | Zhang .................... F04C 28/28 417/45 |
| 2018/0119685 A1 | * | 5/2018 | Kim ................... B60H 1/00878 |
| 2018/0281564 A1 | * | 10/2018 | Baek .................. B60H 1/00878 |
| 2020/0165993 A1 | * | 5/2020 | Owatari ................ F02D 41/062 |

FOREIGN PATENT DOCUMENTS

| | | | | |
|---|---|---|---|---|
| JP | 2014144695 A | | 8/2014 | |
| KR | 2016107855 A | * | 9/2016 | ............. F04B 49/02 |
| KR | 20180084535 A | | 7/2018 | |

* cited by examiner

COMPRESSOR CONTROL METHOD

CROSS REFERENCE TO RELATED PATENT APPLICATIONS

This is a U.S. national phase patent application of PCT/KR2021/011369 filed Aug. 25, 2021 which claims the benefit of and priority to Korea Patent Application No. 10-2020-0107907, filed on Aug. 26, 2020, and Korea Patent Application No. 10-2021-0111904, filed on Aug. 24, 2021, the entire contents of each of which are incorporated herein by reference.

TECHNICAL FIELD

The present disclosure relates to a compressor control method, and more particularly, to a compressor control method capable of preventing sticking due to oil migration of a compressor when a vehicle is left unattended for a long period of time.

BACKGROUND

Figure 1:
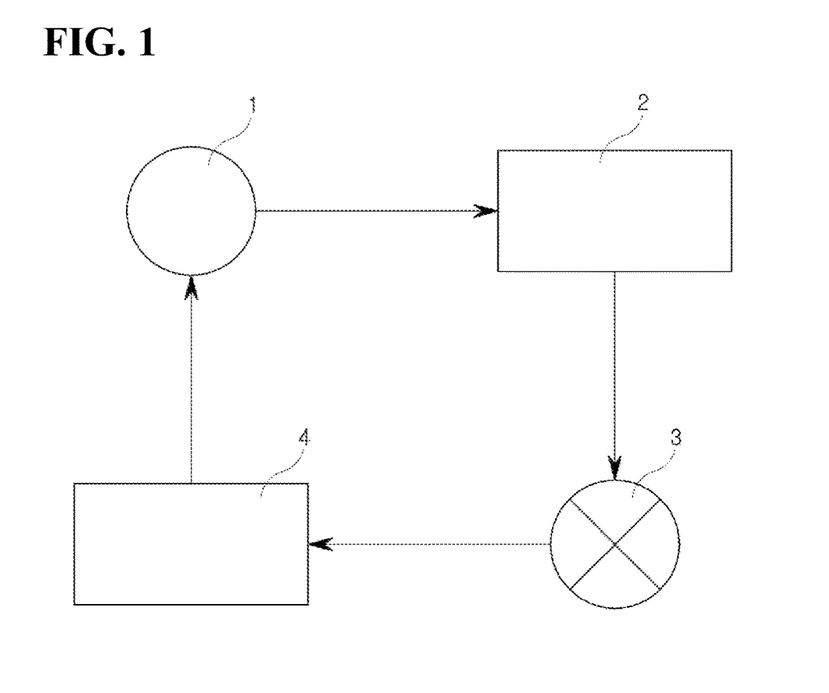
FIG. 1 is a simplified view showing the configuration of a conventional air conditioner.

In general, an air conditioner (A/C) for cooling and heating the interior of a vehicle is installed in a vehicle. Such an air conditioner includes, as illustrated in FIG. 1, a vapor compression and refrigeration cycle mechanism having a compressor 1 for compressing a low-temperature and low-pressure gaseous refrigerant into a high-temperature and high-pressure gaseous refrigerant, a condenser 2 for condensing the high-temperature and high-pressure gaseous refrigerant discharged from the compressor into a low-temperature and high-pressure liquid refrigerant, an expansion valve 3 for expanding the low-temperature and high-pressure liquid refrigerant discharged from the condenser into a low-temperature and low-pressure liquid refrigerant, and an evaporator 4 for evaporating the low-temperature and low-pressure liquid refrigerant discharged from the expansion valve into a low-temperature and low-pressure gaseous refrigerant.

In the air conditioner for a vehicle according to this configuration, when a start signal is input, a compressor is driven to compress the refrigerant, the refrigerant discharged from the compressor is returned to the compressor while circulating through the condenser, the expansion valve, and the evaporator, and the condenser and the evaporator exchange heat with air, and some of the air heat-exchanged with the condenser and the evaporator is supplied to a passenger compartment of the vehicle, thereby providing cooling, heating, and dehumidification.

Here, the conventional compressor control method includes a driving step of receiving a start signal and driving the compressor; and a stopping step of receiving an end signal and stopping the compressor.

However, in this conventional compressor control method, there is a problem in that the compressor is damaged since the compressor is driven even when the oil stored inside the compressor to lubricate the sliding parts of the compressor is insufficient. Specifically, when the vehicle is left in an external environment with a large daily temperature change for a long period of time, the daily temperature change causes migration of the refrigerant and oil in the refrigeration cycle. That is, a migration phenomenon occurs. However, the relatively viscous oil among the refrigerant and oil moved from the compressor to the condenser, expansion valve, and evaporator does not flow back into the compressor, resulting in a shortage of oil in the compressor in which the oil is less than a predetermined reference oil amount. When the compressor is driven in such an oil shortage state, friction of the sliding part increases and sticking occurs, resulting in damage to the compressor. Conventional compressor control methods are formed to drive the compressor without considering this problem.

SUMMARY

The present disclosure aims to provide a compressor control method capable of preventing sticking due to oil migration of a compressor when a vehicle is left unattended for a long period of time.

The technical problem of the present disclosure is not limited to the above-described problem and other problems which are not described herein may be clearly understood by those skilled in the art from the following description of the present disclosure.

In order to solve the above problem, the present disclosure allows the oil in the air conditioner to flow into the compressor by circulating the compressor at a low speed for a predetermined time period before normal operation of the compressor, when the vehicle is left unattended for a long period of time.

One embodiment is a compressor control method, including: when driving of a compressor of a vehicular air conditioner starts, a determining step of determining whether a condition for limiting an output of the compressor is satisfied by using at least one among whether a power supply unit of a vehicle is reset, a start-off period P1 of the vehicle and the number of times the compressor is driven N1; an output limiting step of limiting an output of the compressor when the condition for limiting the output of the compressor is satisfied; a third determining step of determining an output limiting driving time of the compressor driven in a state in which the output is limited by the output limiting step; a normal driving step of canceling the output limitation of the compressor and normally driving the compressor when the output limiting driving time of the compressor is equal to or greater than a predetermined reference time.

According to the embodiment, the determining step may include: a first determining step of determining whether a power supply unit of a vehicle is reset when driving of a compressor of a vehicular air conditioner starts; and when the power supply unit is not reset, a second determining step of determining a start-off period P1 of a vehicle, and an output of the compressor may be limited when the power supply unit is reset or when the start-off period P1 of the vehicle is equal to or greater than a predetermined reference period p1.

According to the embodiment, the second determining step may determine the start-off period of the vehicle according to a determination of an off period of an electronic control unit (ECU) of the vehicle.

According to the embodiment, the determining step may include: a fourth determining step of determining the number of times the compressor is driven N1 when driving of a compressor of a vehicular air conditioner starts, and the output of the compressor may be limited when the number of times the compressor is driven N1 is twice or more and less than a predetermined reference number of times n1.

According to the embodiment, the output limiting step may limit a ramp-up speed of the number of rotations of the compressor.

According to the embodiment, the output limiting step may limit revolutions per minute (rpm) at which the number of rotations of the compressor increases per second to 100 rpm or less.

According to the embodiment, the output limiting step may not limit the ramp-up speed of the number of rotations of the compressor until a minimum starting rpm of the compressor is reached.

According to the embodiment, in the output limiting step, the minimum starting rpm of the compressor is 1000 rpm.

According to the embodiment, the output limiting step may limit a maximum rpm of the compressor.

According to the embodiment, in the output limiting step, the maximum rpm of the compressor is 4000 rpm.

According to the embodiment, the third determining step may determine a consecutive time period of the output limiting driving T1 of the compressor for which the compressor is continuously driven in a state in which the output is limited.

According to the embodiment, the normal driving step may be executed when the consecutive time period of the output limiting driving T1 of the compressor is equal to or greater than a predetermined first reference time period t1.

According to the embodiment, when the compressor is driven in a state in which the output is limited by the output limiting step and then turned off and then driven again, the output limiting step may be executed and the compressor is driven again in a state in which the output is limited, and the third determining step may further determine a total cumulative time period of the output limiting driving T2 in which the consecutive time period of the output limiting driving T1 of the compressor is accumulated.

According to the embodiment, the normal driving step may be executed when the cumulative time period of the output limiting driving T2 of the compressor is equal to or greater than a predetermined second reference time period t2.

According to the embodiment, the predetermined second reference time period t2 may be twice or more than the first reference time period t1.

According to the embodiment, the vehicular air conditioner may form a refrigeration cycle including: the compressor for compressing a low-temperature and low-pressure gaseous refrigerant into a high-temperature and high-pressure gaseous refrigerant, a condenser for condensing the high-temperature and high-pressure gaseous refrigerant discharged from the compressor into a low-temperature and high-pressure liquid refrigerant, an expansion valve for expanding the low-temperature and high-pressure liquid refrigerant discharged from the condenser into a low-temperature and low-pressure liquid refrigerant, and an evaporator for evaporating the low-temperature and low-pressure liquid refrigerant discharged from the expansion valve into a low-temperature and low-pressure gaseous refrigerant, and the first reference time period t1 may be a time period for which the refrigerant is compressed and discharged from the compressor, forms the refrigeration cycle, and returns to the compressor.

According to the embodiment, the first reference time period t1 may be a time period for which a temperature change of the evaporator is 3° C. or more.

According to the embodiment, the first reference time period t1 may be a time period for which oil of the compressor circulates once in the refrigeration cycle.

According to the present disclosure, when oil migration occurs in the air conditioner for a vehicle since the vehicle is left unattended for a long period of time, by limiting an output of the compressor and conducting a pre-run of the compressor for a certain period of time prior to normal operation of the compressor, it becomes possible to make the oil in the air conditioner flow into the compressor. By doing so, it is possible to prevent sticking and damage of the compressor due to lack of oil in the compressor.

It should be appreciated that the advantageous effects of the present disclosure are not limited to the effects described above, but encompass all effects that can be derived from the configurations of the present invention disclosed in the detailed description of the invention.

DESCRIPTION OF AN EMBODIMENT

Hereinafter, exemplary embodiments of the compressor control method of the present disclosure will be described in further detail with reference to the accompanying drawings.

Further, terms described below are defined in consideration of the functions in the present disclosure, and may have different meanings according to the intention of a user or operator or the convention. The following embodiments are not intended to limit the scope of the present invention, but merely illustrate the constituent elements described in the present disclosure.

Parts unrelated to the detailed description are omitted to ensure clarity of the present disclosure. Like reference numerals denote like or similar elements throughout the specification. It will also be understood that the terms "comprises", "includes", and "has" used herein specify the presence of stated elements, but do not preclude the presence or addition of other elements, unless otherwise defined.

Like the air conditioner shown in FIG. 1, the air conditioner for a vehicle according to the present disclosure may include a compressor 1 for compressing a low-temperature and low-pressure gaseous refrigerant into a high-temperature and high-pressure gaseous refrigerant, a condenser 2 for condensing the high-temperature and high-pressure gaseous refrigerant discharged from the compressor 1 into a low-temperature and high-pressure liquid refrigerant, an expansion valve 3 for expanding the low-temperature and high-pressure liquid refrigerant discharged from the condenser 2 into a low-temperature and low-pressure liquid refrigerant, and an evaporator 4 for evaporating the low-temperature and low-pressure liquid refrigerant discharged from the expansion valve 3 into a low-temperature and low-pressure gaseous refrigerant.

The compressor 1 is driven to compress the refrigerant, the refrigerant discharged from the compressor is returned to the compressor while circulating through the condenser 2, the expansion valve 3, and the evaporator 4, and the condenser 2 and the evaporator 4 exchange heat with air, and some of the air heat-exchanged with the condenser 2 and the evaporator 4 is supplied to a passenger compartment of the vehicle, thereby providing cooling, heating, and dehumidification.

Figure 2:
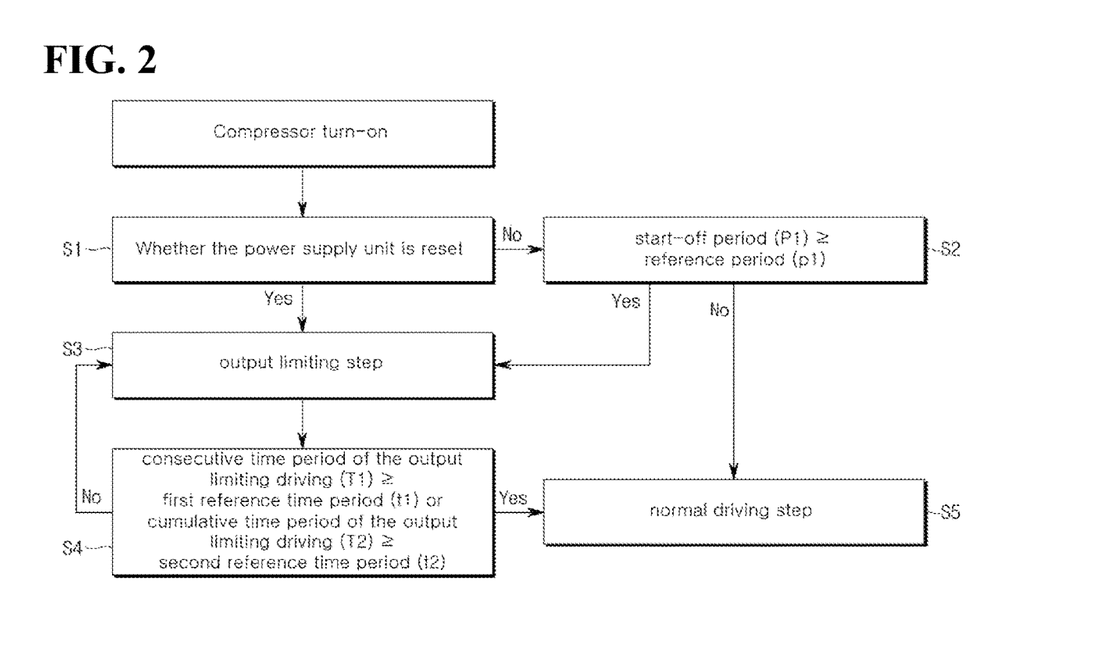
FIG. 2 is a flow chart showing a compressor control method according to an embodiment of the present disclosure.

Hereinafter, a compressor control method according to an embodiment of the present disclosure will be described with reference to FIG. 2.

A compressor control method according to an embodiment of the present disclosure includes: when driving of a compressor of a vehicular air conditioner starts, a determining step (S1, S2, S6) of determining whether a condition for limiting an output of the compressor is satisfied by using at least one among whether a power supply unit of the vehicle is reset, a start-off period P1 of the vehicle and the number of times the compressor is driven N1; an output limiting step (S3) of limiting an output of the compressor when the condition for limiting the output of the compressor is satisfied; a third determining step (S4) of determining an output limiting driving time of the compressor driven in a state in which the output is limited by the output limiting step; a normal driving step (S5) of canceling the output limitation of the compressor and normally driving the compressor when the output limiting driving time of the compressor is equal to or greater than a predetermined reference time.

Specifically, the determining step in the present embodiment includes: a first determining step (S1) of determining whether a power supply unit of the vehicle is reset when driving of the compressor of the vehicular air conditioner starts; and a second determining step (S2) of determining a start-off period P1 of the vehicle when the power supply unit is not reset, and the output of the compressor is limited when the power supply unit is reset or when the start-off period P1 of the vehicle is equal to or greater than a predetermined reference period p1.

The first determining step (S1) determines whether the power supply unit of the vehicle, for example, a 12V battery, is reset or not. When the battery is reset, since the start-off period cannot be accurately determined through the vehicle's electronic control unit (ECU), and the like, the output limiting step (S3) is executed to limit the output of the compressor, by considering that the vehicle has been left unattended for a certain period of time.

When it is determined in the first determining step (S1) that the power supply unit has not been reset, the second determining step (S2) of determining the start-off period P1 of the vehicle is executed. Accordingly, the output limiting step (S3) of limiting the output of the compressor is executed when the start-off period P1 of the vehicle is equal to or greater than the predetermined reference period p1, and the compressor may normally be driven when the start-off period P1 of the vehicle is less than the predetermined reference period p1. The reference period p1 may be arbitrarily set. For example, when the reference period p1 is 20 days, the output limiting step (S3) is executed when the start-off period P1 of the vehicle is 20 days or more, and the compressor may be normally driven when the start-off period P1 of the vehicle is less than 20 days.

At this time, as the second determining step (S2) may determine the start-off period P1 of the vehicle according to a determination of the off period of the electronic control unit (ECU) of the vehicle.

The output limiting step (S3) may limit a ramp-up speed of the number of rotations of the compressor. In the output limiting step (S3), it is preferable to limit the rpm at which the number of rotations of the compressor increases per second to 100 rpm or less, but is not limited thereto. That is, in the output limiting step (S3), the number of rotations of the compressor is not increased to exceed 100 rpm per second. In this way, by limiting the ramp-up speed of the number of rotations of the compressor, the rpm of the compressor may be gradually increased, and the compressor may be operated without damage due to friction since driving of the compressor until the oil is circulated.

At this time, according to the embodiment, in the output limiting step (S3), the ramp-up speed of the number of rotations of the compressor may not be limited until the compressor is driven at the minimum starting rpm. For example, the minimum starting rpm of the compressor may be set to 1000 rpm, even if the condition for limiting the output of the compressor is satisfied and the output limiting step (S3) is executed, the ramp-up speed of the number of rotations of the compressor is not limited by 1000 rpm. In this way, in the output limiting step (S3), the ramp-up speed of the number of rotations of the compressor may be limited for the entire time, but may also be limited for a part of the time, of course.

Alternatively, the output limiting step (S3) may limit the maximum rpm of the compressor. Similarly, by limiting the maximum rpm of the compressor, the compressor may be operated without damage due to friction until the oil is circulated after driving the compressor. In this way, the compressor is circulated at a low speed for a certain period of time before normal operation of the compressor such that the oil in the air conditioner can be introduced into the compressor. For example, the maximum rpm of the compressor may be set to 4000 rpm, and the number of rotations of the compressor does not exceed 4000 rpm in the output limiting step (S3) such that wear or sticking does not occur even in the non-lubricated state of the compressor.

As the output limiting step (S3) is executed, the third determining step (S4) may determine the consecutive time period of the output limiting driving T1 of the compressor for which the compressor is continuously driven in a state in which the output is limited. Accordingly, when the consecutive time period of the output limiting driving T1 of the compressor is equal to or greater than the predetermined first reference time period t1, the normal driving step (S5) is executed, and when the consecutive time period of the output limiting driving T1 of the compressor is less than the predetermined first reference time period T1, the output limit step S3 is continuously executed.

Moreover, when the compressor is driven in a state in which the output is limited by the output limiting step (S3) and then turned off and then driven again, the output limiting step (S3) is executed and driven again in a state in which the output is limited, and the third determining step (S4) may further determine the cumulative time period of the output limiting driving T2 of the compressor, which is a total cumulative sum of the consecutive time period of the output limiting driving T1 of the compressor.

Accordingly, when the cumulative time period of the output limiting driving T2 of the compressor is greater than or equal to the predetermined second reference time period t2, the normal driving step (S5) is executed, and when the cumulative time period of the output limiting driving T2 of the compressor is less than the predetermined second reference time period t2, the output limiting step (S3) is executed continuously.

That is, if any one among a condition when the consecutive time period of the output limiting driving T1 of the compressor is greater than or equal to the predetermined first reference time period t1, and a condition when the cumulative time period of the output limiting driving T2 of the compressor is equal to or greater than the predetermined second reference time period t2, is satisfied, the normal driving step (S5) may be executed.

Although not limited thereto, the second reference time period t2 is preferably twice or more than the first reference time period t1 such that the oil can be sufficiently circulated into the compressor even if the compressor is restarted after being stopped.

For example, the first reference time period t1 may be set to 30 seconds, and the second reference time period t2 may be set to 60 seconds. At this time, assume that the compressor is driven for 15 seconds in a state where the output is limited by the output limiting step (S3), the compressor is stopped by turn-off of the air conditioner, then the compressor is turned on again by turn-on of the air conditioner and the compressor is driven for 20 seconds in a state where the output is limited by the output limiting step (S3). In this case, the consecutive time period of the output limiting driving T1 of the compressor is 20 seconds at the present time point, and the cumulative time period of the output limiting driving T2 of the compressor is 35 seconds obtained by adding up 15 seconds and 20 seconds. Therefore, since the consecutive time period of the output limiting driving T1 of the compressor does not exceed 30 seconds, which is the first reference time period t1, and the cumulative time period of the output limiting driving T2 of the compressor also does not exceed 60 seconds, which is the second reference time, the output limiting step (S3) will continue to be maintained.

Figure 3:
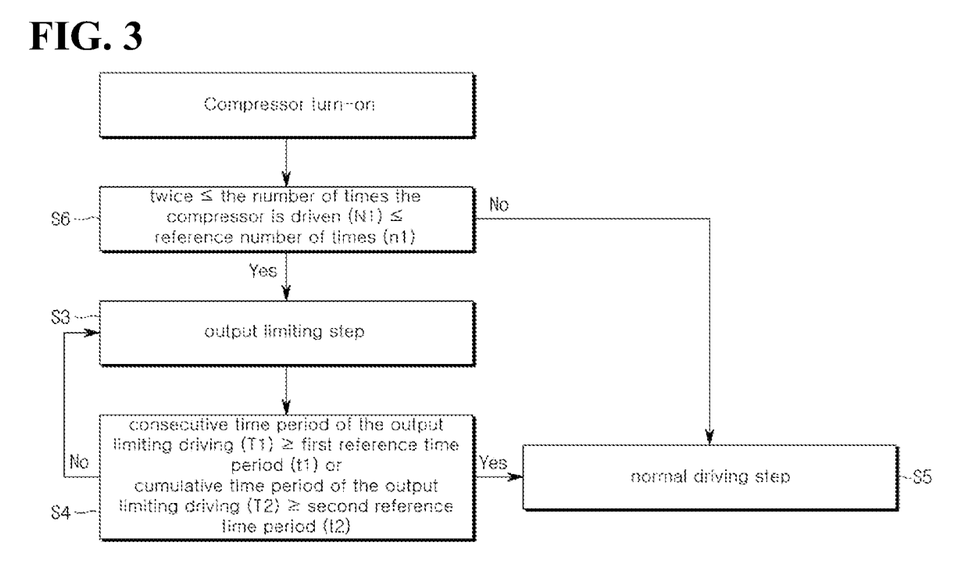
FIG. 3 is a flow chart showing a compressor control method according to another embodiment of the present disclosure.

Next, a compressor control method according to another embodiment of the present disclosure will be described with reference to FIG. 3.

The compressor control method according to another embodiment of the present disclosure may include a fourth determining step (S6) of determining the number of times the compressor is driven N1 when driving of the compressor of the vehicular air conditioner starts, an output limiting step (S3) of limiting an output of the compressor when the number of times the compressor is driven N1 is twice or more and less than a predetermined reference number of times n1, a third determining step (S4) of determining an output limiting driving time of the compressor driven in a state in which the output is limited by the output limiting step and a normal driving step (S5) of canceling the output limitation of the compressor and normally driving the compressor when the output limiting driving time of the compressor is equal to or greater than a predetermined reference time.

Since the embodiment according to FIG. 3 differs from the previously described embodiment according to FIG. 2 only in conditions for limiting the output of the compressor and the rest is the same, only the different parts will be described.

When driving of the compressor starts, the fourth determining step (S6) may determine the number of times the compressor is driven N1 after the initial installation of the compressor. That is, the number of times the compressor is driven N1 may be determined on the basis of the first driving of the compressor in a state where the battery of the vehicle and the IGN are turned on.

Accordingly, when the number of times the compressor is driven N1 is twice or more and less than or equal to the predetermined reference number of times n1, the output limiting step (S3) may be executed. Oil migration does not occur when the compressor is first driven for testing after the initial installation, so the case of which is excluded. Although not limited thereto, the output limiting step (S3) may be executed when the number of times that oil migration of the compressor is likely to occur, for example, the number of times the compressor is driven N1 is 2 to 10 times. The logic after the output limiting step (S3) is executed is the same as described above.

FIGS. 4 to 7 are graphs showing the rpm over time (seconds) of the compressor controlled by the output limiting step compared to the conventional compressor. Here, (a) is a graph showing the rpm over time of the compressor according to the present disclosure, and (b) is a graph showing the rpm over time of the conventional compressor. For example, in the graph, each horizontal line may correspond to 5 seconds, and each vertical line may correspond to 1000 rpm.

Figure 4:
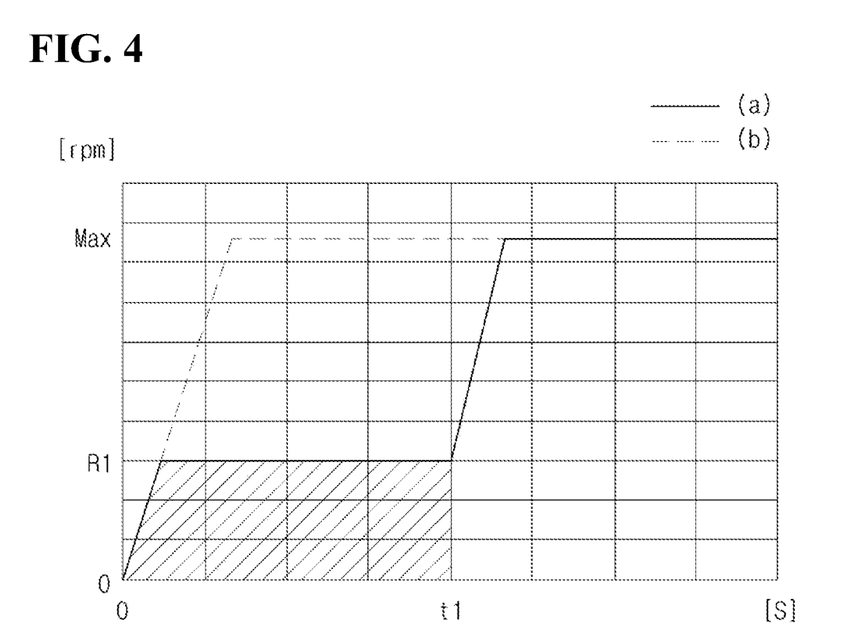
FIGS. 4 to 7 are graphs showing the rpm over time of the compressor controlled by the output limiting step compared to the conventional compressor.

Referring to the graph of FIG. 4, the output limiting step (S3) limits the maximum rpm R1 of the compressor, and does not limit the ramp-up speed of the number of rotations of the compressor. The maximum rpm R1 may be set to the maximum rpm at which wear or sticking does not occur even when the compressor is not lubricated, for example, 4000 rpm. As shown in the graph, after the output limiting step (S3) starts, the ramp-up speed of the number of rotations of the compressor is not limited, so the rpm increases in the same way as before, however, after reaching the maximum rpm R1, the rpm does not increase anymore and is maintained at the maximum rpm R1 until the first reference time period t1.

Here, the first reference time period t1 may be set to a time period for which the refrigerant is compressed and discharged from the compressor when the compressor rotates at the maximum rpm R1, forms at least one refrigeration cycle or one heat pump cycle, and returns to the compressor. For example, in the air conditioner cycle of refrigeration, the temperature change of the evaporator must be at least 3° C. or more (outside room temperature of 20° C. or more). Alternatively, the first reference time period t1 may be set to a time period for which the oil of the compressor is circulated once.

Thereafter, when the third determining step (S4) determines that the consecutive time period of the output limiting driving T1 of the compressor is greater than or equal to the first reference time period t1, the normal driving step (S5) is executed so that the output limitation of the compressor is canceled and the compressor may be normally driven at a high ramp-up speed of the number of rotations (for example, 1350 rpm increases per second) as in the conventional compressor.

Figure 5:
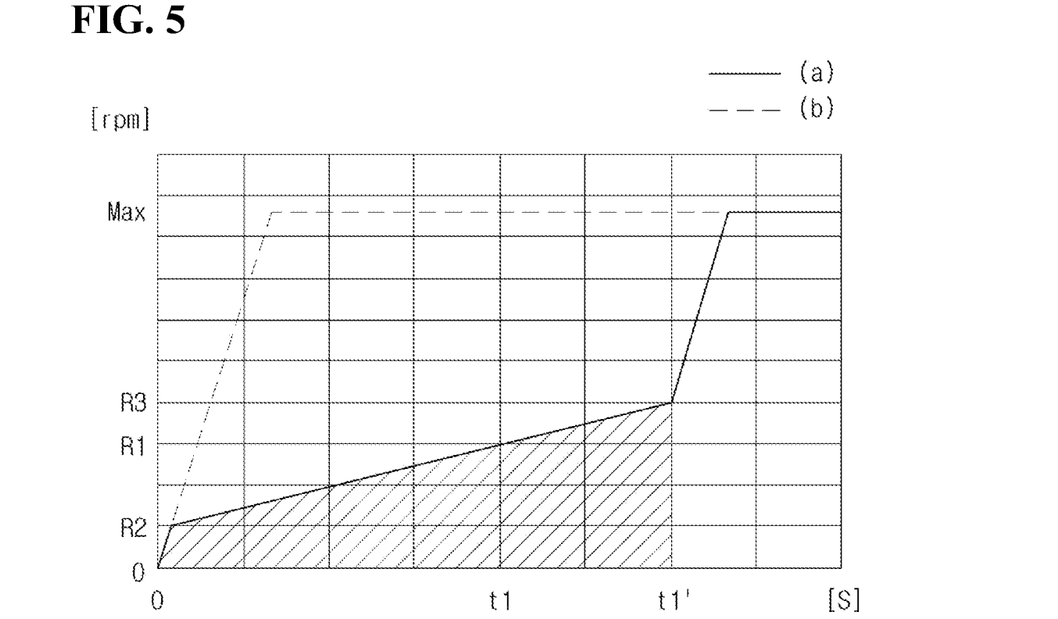

Next, looking at the graph of FIG. 5, the output limiting step (S3) limits the ramp-up speed of the number of rotations of the compressor, that is, the rpm that increases per second. For example, the output limiting step (S3) may limit the ramp-up speed of the number of rotations of the compressor to 100 rpm or less per second. As shown in the graph, at the beginning of the operation of the compressor after the output limiting step (S3) starts, the rpm may be increased at the same ramp-up speed of the number of rotations as in the conventional compressor to satisfy the minimum starting rpm R2 (e.g., 1000 rpm). However, after the minimum starting rpm is satisfied, the ramp-up speed of the number of rotations is limited, so that the rpm of the compressor is gradually increased, that is, 100 rpm or below per second, until a first reference time period t1'. At this time, the maximum rpm at the first reference time period t1' is represented as R3, and it is preferable that the maximum rpm R3 in the output limiting step (S3) does not exceed 4000 rpm so that wear or sticking does not occur even in the non-lubricated state of the compressor.

In addition, an area in the graph of FIG. 5 by the first reference time period t1' is preferably equal to or greater than an area in the graph of FIG. 4 by the first reference time period t1. As shown in FIG. 5, when the number of rotations is increased at a low speed, under a concept of 'RPM×time', the first reference time period t1' means the time period for which the refrigerant at the accumulated flow rate flows for at least one cycle or more after the compressor starts compressing the refrigerant and returns to the compressor. In particular, the rpm at the first reference time period t1 in FIG. 5 should be equal to or less than the maximum rpm R1 shown in FIG. 4.

Figure 6:
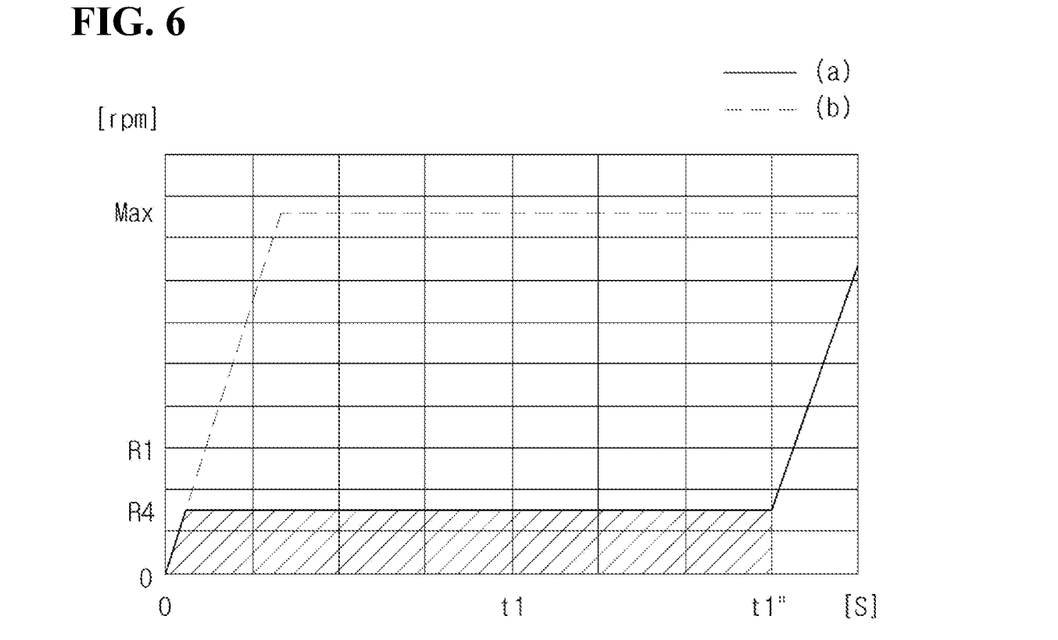

Next, looking at the graph of FIG. 6, the output limiting step (S3) limits the maximum rpm R4 of the compressor, as in the graph of FIG. 4, but does not limit the ramp-up speed of the number of rotations of the compressor. However, the maximum rpm R4 is set lower than the maximum rpm R1 shown in FIG. 4. In this case, an area in the graph of FIG. 6 by the first reference time period t1" is preferably equal to or larger than the area in the graph of FIG. 4 by the first reference time period t1. Likewise, as shown in FIG. 6, under a concept of 'RPM×time', the first reference time period t1" means the time period for which the refrigerant at the accumulated flow rate flows for at least one cycle or more after the compressor starts compressing the refrigerant and returns to the compressor.

Figure 7:
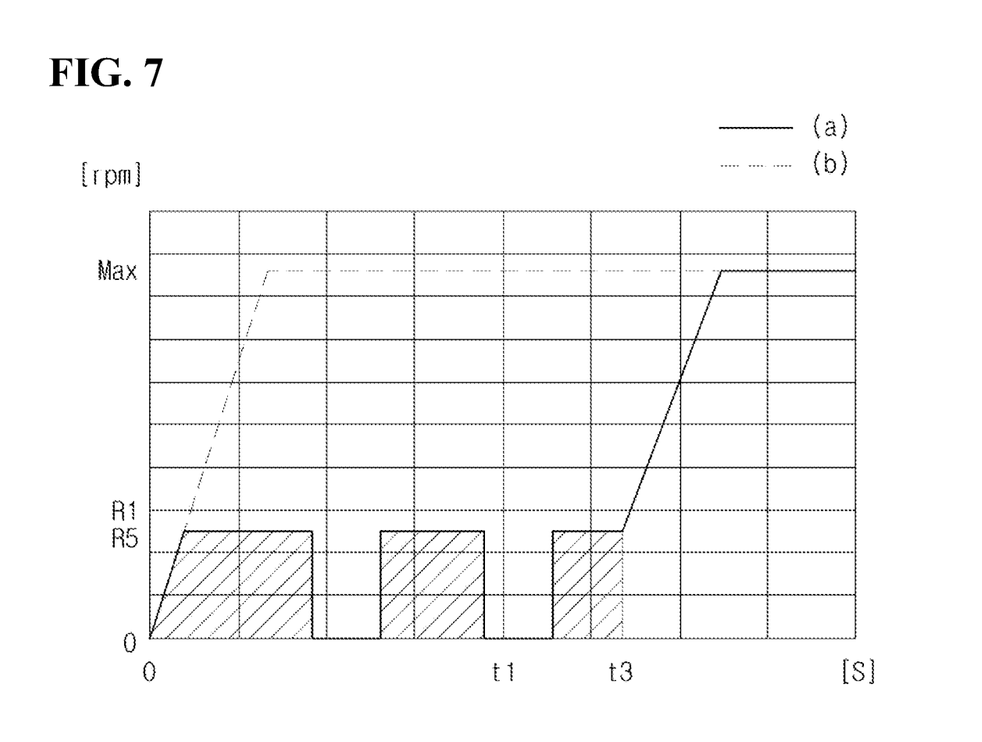

Next, looking at the graph of FIG. 7, the output limiting step (S3) is driving the compressor at an initial stage by setting the maximum rpm R5 of the compressor lower than the maximum rpm R1 shown in FIG. 4, and the compressor turnoff occurs before reaching to the first reference time period t1. At this time, it is preferable for the output limiting step (S3) to limit the maximum rpm R5 until an area in the graph of FIG. 7 by the third reference time t3 is equal to or greater than the area in the graph of FIG. 4 by the first reference time period t1.

According to the present disclosure, when oil migration occurs in the air conditioner for a vehicle due to the vehicle being left unattended for a long period of time, the compressor is pre-run, with the output of the compressor limited, for a certain period of time before normal operation of the compressor, thereby the oil in the air conditioner is allowed to flow into the compressor. Accordingly, it is possible to prevent sticking due to lack of oil in the compressor and damage due to the sticking.

The present disclosure is not limited to the above-described specific embodiments and descriptions, and various modifications may be made by those skilled in the art without departing from the gist of the present disclosure. Such variations are within the protection scope of the present disclosure.

The present disclosure relates to a compressor control method, and more particularly, to a compressor control method capable of preventing sticking due to oil migration of a compressor when a vehicle is left unattended for a long period of time.

What is claimed is:

1. A compressor control method comprising:
    starting a driving of a compressor of a vehicular air conditioner;
    determining, at an instant the driving of the compressor starts, that a condition is satisfied for driving the compressor in a state where an output of the compressor is limited by using at least one among whether an electric power supply unit of a vehicle is in a state of reset, a start-off period P1 of the vehicle, and a number of times the compressor has previously been driven N1;
    driving the compressor in the state where the output of the compressor is limited in reaction to the condition for driving the compressor in the state where the output of the compressor is limited being determined to be satisfied at the instant the driving of the compressor starts;
    determining an output limiting driving time of the compressor corresponding to an amount of time the compressor is driven in the state where the output of the compressor is limited;
    canceling the driving of the compressor in the state where the output of the compressor is limited and normally driving the compressor in reaction to the output limiting driving time of the compressor being determined to be equal to or greater than a predetermined reference time.

2. The compressor control method of claim 1, wherein the step of determining that a condition is satisfied for driving the compressor in a state where an output of the compressor is limited comprises:
    a first determining step of determining whether the electric power supply unit of the vehicle is in the state of reset at the instant the driving of the compressor starts; and
    in reaction to the electric power supply unit not being in a state of reset, a second determining step of determining the start-off period P1 of the vehicle, wherein the compressor is driven in the state where the output of the compressor is limited in reaction to the electric power supply unit being in the state of reset or the start-off period P1 of the vehicle being equal to or greater than a predetermined reference period p1.

3. The compressor control method of claim 2, wherein the second determining step determines the start-off period of the vehicle according to a determination of an off period of an electronic control unit (ECU) of the vehicle.

4. The compressor control method of claim 1, wherein the step of determining that a condition is satisfied for driving the compressor in a state where an output of the compressor is limited comprises:
    a fourth determining step of determining the number of times the compressor has previously been driven N1 at the instant the driving of the compressor starts, and
    wherein the compressor is driven in the state where the output of the compressor is limited in reaction to the number of times the compressor has previously been driven N1 being twice or more and less than a predetermined reference number of times the compressor has previously been driven N1.

5. The compressor control method of claim 1, wherein the driving the compressor in the state where the output of the compressor is limited includes limiting a ramp-up speed of a number of rotations of the compressor.

6. The compressor control method of claim 5, wherein the driving the compressor in the state where the output of the compressor is limited includes limiting revolutions per minute (rpm) at which the number of rotations of the compressor increases per second to 100 rpm or less.

7. The compressor control method of claim 5, wherein the driving the compressor in the state where the output of the compressor is limited includes not limiting the ramp-up speed of the number of rotations of the compressor until a minimum starting rpm of the compressor is reached.

8. The compressor control method of claim 7, wherein the minimum starting rpm of the compressor is 1000 rpm.

9. The compressor control method of claim 1, wherein the driving the compressor in the state where the output of the compressor is limited includes limiting a maximum rpm of the compressor.

10. The compressor control method of claim 9, wherein the driving the compressor in the state where the output of the compressor is limited includes limiting the maximum rpm of the compressor to 4000 rpm.

11. The compressor control method of claim 1, wherein the determining of the output limiting driving time of the compressor includes determining a consecutive time period of the output limiting driving T1 of the compressor for which the compressor is continuously driven in the state in which the output is limited.

12. The compressor control method of claim 11, wherein the step of normally driving the compressor is executed in reaction to the consecutive time period of the output limiting driving T1 of the compressor being equal to or greater than a predetermined first reference time period t1.

13. The compressor control method of claim 12, wherein in reaction to the compressor being driven in the state in which the output is limited and then turned off and then driven again, the limiting of the output of the compressor is executed, and wherein the step of determining the output limiting driving time of the compressor includes determining a total cumulative time period of the output limiting driving T2 in which the consecutive time period of the output limiting driving T1 of the compressor is accumulated.

14. The compressor control method of claim 13, wherein the step of normally driving the compressor is executed in reaction to the cumulative time period of the output limiting driving T2 of the compressor being equal to or greater than a predetermined second reference time period t2.

15. The compressor control method of claim 14, wherein the predetermined second reference time period t2 is twice or more than the first reference time period t1.

16. The compressor control method of claim 12, wherein the vehicular air conditioner forms a refrigeration cycle comprising the compressor for compressing a low-temperature and low-pressure gaseous refrigerant into a high-temperature and high-pressure gaseous refrigerant, a condenser for condensing the high-temperature and high-pressure gaseous refrigerant discharged from the compressor into a low-temperature and high-pressure liquid refrigerant, an expansion valve for expanding the low-temperature and high-pressure liquid refrigerant discharged from the condenser into a low-temperature and low-pressure liquid refrigerant, and an evaporator for evaporating the low-temperature and low-pressure liquid refrigerant discharged from the expansion valve into a low-temperature and low-pressure gaseous refrigerant, and wherein the first reference time period t1 is a time period for which the refrigerant is compressed and discharged from the compressor, forms the refrigeration cycle, and returns to the compressor.

17. The compressor control method of claim 12, wherein the vehicular air conditioner forms a refrigeration cycle comprising:
the compressor for compressing a low-temperature and low-pressure gaseous refrigerant into a high-temperature and high-pressure gaseous refrigerant, a condenser for condensing the high-temperature and high-pressure gaseous refrigerant discharged from the compressor into a low-temperature and high-pressure liquid refrigerant, an expansion valve for expanding the low-temperature and high-pressure liquid refrigerant discharged from the condenser into a low-temperature and low-pressure liquid refrigerant, and an evaporator for evaporating the low-temperature and low-pressure liquid refrigerant discharged from the expansion valve into a low-temperature and low-pressure gaseous refrigerant, and
wherein the first reference time period t1 is a time period for which a temperature change of the evaporator is 3° C. or more.

18. The compressor control method of claim 12, wherein the vehicular air conditioner forms a refrigeration cycle comprising:
the compressor for compressing a low-temperature and low-pressure gaseous refrigerant into a high-temperature and high-pressure gaseous refrigerant, a condenser for condensing the high-temperature and high-pressure gaseous refrigerant discharged from the compressor into a low-temperature and high-pressure liquid refrigerant, an expansion valve for expanding the low-temperature and high-pressure liquid refrigerant discharged from the condenser into a low-temperature and low-pressure liquid refrigerant, and an evaporator for evaporating the low-temperature and low-pressure liquid refrigerant discharged from the expansion valve into a low-temperature and low-pressure gaseous refrigerant, and
wherein the first reference time period t1 is a time period for which oil of the compressor circulates once in the refrigeration cycle.

\* \* \* \* \*